United States Patent
Takahashi

(10) Patent No.: US 7,299,138 B2
(45) Date of Patent: Nov. 20, 2007

(54) STRESS MEASUREMENT METHOD AND ITS APPARATUS

(76) Inventor: Sennosuke Takahashi, 1321-15 Kanamori, Machida-shi, Tokyo (JP)

(*) Notice: Subject to any disclaimer, the term of this patent is extended or adjusted under 35 U.S.C. 154(b) by 8 days.

(21) Appl. No.: 11/312,516

(22) Filed: Dec. 21, 2005

(65) Prior Publication Data

US 2006/0136152 A1    Jun. 22, 2006

(30) Foreign Application Priority Data

Dec. 21, 2004    (JP) ............................ 2004-369183

(51) Int. Cl.
*G01L 1/00*    (2006.01)
(52) U.S. Cl. ...................................... 702/42
(58) Field of Classification Search .................. 702/33, 702/42, 44, 114, 171, 182, 189; 73/597, 73/598, 644
See application file for complete search history.

(56) References Cited

U.S. PATENT DOCUMENTS 5,549,001 A * 8/1996 Brokowski et al. ............ 73/597
5,549,003 A * 8/1996 Drescher-Krasicka ........ 73/606

FOREIGN PATENT DOCUMENTS

| JP | 5-203513 | 8/1993 |
| JP | 2001-041942 | 2/2001 |
| JP | 2001-174344 | 6/2001 |

OTHER PUBLICATIONS

English Language Abstract of JP 5-203513.
English Language Abstract of JP 2001-041942.
English Language Abstract of JP 2001-174344.

* cited by examiner

*Primary Examiner*—Bryan Bui
(74) *Attorney, Agent, or Firm*—Greenblum & Bernstein, P.L.C.

(57) ABSTRACT

Time of flight of sound $t_o$, $t_n$ propagating through fixed one face to another of the object under zero load ($\sigma_o$) and changed applied load ($\sigma_n$) respectively are measured, then stress dependent coefficient α peculiar to material of the object can be obtained from above data and the equation determined beforehand $\alpha = f(\Delta t_n, \sigma_n)$ using stress dependent coefficient calculation circuit 12. Time of flight of sound t propagating through one face to another of the object 1 at the determined place under applied unknown load is measured next. Time of flight $t_n$, $t_o$ are measured by time of flight measurement system 11. This invention consists of the stress measurement method and the apparatus to calculate real stress caused in the practically equipped object using equation $\sigma = f(\Delta t, \alpha)$ determined beforehand based on time of flight t and stress dependent coefficient α mentioned above.

17 Claims, 8 Drawing Sheets

| Elastic modulus of S20C steel ||
|---|---|
| Poisson's ratio    $\nu$ | 0.2885 |
| Young's modulus    $E$ | 206.783 MPa × 10³ |
| Lamé constants    $\lambda$ | 109.4605 MPa × 10³ |
| Lamé constants    $\mu$ | 80.2415 MPa × 10³ |

FIG. 7

| n | applied stress $\sigma_n$ (MPa) | $\Delta t_n / t_0$ longitudinal direction ($\times 10^{-6}$) | $\Delta t_n / t_0$ transverse direction ($\times 10^{-6}$) |
|---|---|---|---|
| 1 | 5.439 | | -292 |
| 2 | 10.878 | | -341 |
| 3 | 16.317 | | -292 |
| 4 | 21.756 | | -292 |
| 5 | 27.195 | 66 | -341 |
| 6 | 32.634 | 164 | -390 |
| 7 | 38.074 | 197 | -390 |
| 8 | 43.513 | 263 | -487 |
| 9 | 48.952 | 345 | -390 |
| 10 | 54.391 | 394 | -438 |
| 11 | 59.83 | 492 | -438 |
| 12 | 65.269 | 542 | -438 |
| 13 | 70.707 | 591 | -487 |
| 14 | 76.146 | 656 | -487 |
| 15 | 81.585 | 689 | -487 |
| 16 | 87.024 | 755 | -536 |
| 17 | 92.463 | 821 | -536 |
| 18 | 97.902 | 854 | -585 |
| 19 | 103.341 | 919 | -585 |
| 20 | 108.78 | 1017 | -585 |
| 21 | 114.219 | 1050 | -633 |
| 22 | 119.658 | 1132 | -682 |
| 23 | 125.097 | 1181 | -633 |
| 24 | 130.536 | 1214 | -682 |
| 25 | 135.975 | 1313 | -682 |
| 26 | 141.414 | 1379 | -682 |
| 27 | 146.853 | 1445 | -731 |
| 28 | 152.292 | 1443 | -731 |
| 29 | 157.731 | 1575 | -731 |
| 30 | 163.17 | 1608 | -731 |
| 31 | 168.609 | 1690 | -731 |
| 32 | 174.048 | 1756 | -780 |
| 33 | 179.487 | 1822 | -780 |
| 34 | 184.926 | 1888 | -780 |
| 35 | 190.365 | 1969 | -780 |
| 36 | 195.804 | 2018 | -780 |
| 37 | 201.243 | 2117 | -878 |
| 38 | 204.506 | 2150 | -878 |
| 39 | 206.682 | 2183 | -829 |
| 40 | 208.858 | 2216 | -829 |

S20C steel $\alpha_{T2}$ (transverse direction)

$y = -2.7779x - 285.9$

S20C steel $\alpha_{T1}$ (longitudinal direction)

$y = 11.525x - 241.45$

STRESS MEASUREMENT METHOD AND ITS APPARATUS

BACKGROUND OF THE INVENTION

1. Field of the Invention

This invention relates to a stress measurement method and its apparatus. The stress of material in the process, goods (for example, single crystal of semiconductor etc.) and unknown stresses in the composed parts under the power station, high pressure plants, airplane, vehicles, various kinds of device, and the material of parts inthe other constructions etc. are especially able to rapidly quantitatively obtain by use of this invention.

2. Related Art

The various kind of vehicles or constructions mainly made of metals are generally used for semi permanent term. Contrarily, each part is necessary to be repaired or exchanged with a lapse of determined time because of its partial damage.

In the various kinds of vehicle, not only axle supporting weight of vehicle but also connective bolt and power transmission are under continuously or repeatedly dynamical or static load. The material having the strength enough to endure the stresses owing to the above various loads is selected and used as the material of these parts. Even such case, it is necessary to do about periodical inspection of whole equipment and exchange of the damageable place.

The understanding of the magnitude and fluctuation of inner stress occurred by applied load gives important information to estimate the fatigue of the concerned material and to study on the improvement of material or the shape. Therefore the strict measurement of stress in these parts have been performed especially by use of ultrasonic waves in most cases, as shown in the patent 5-203513.

In the invention described in the official report Patent No. 5-203513 (the measurement method of the axle stress of bolt by the ultrasonics), measurements of stress both longitudinal and transverse waves are necessary for the concerned material to be measured. Therefore these measurements are always complicated in the preparation of both sensors of longitudinal and transverse waves. Moreover in this patent reference 1, the relation between the sound velocity ratio R and the stress σ was not disclosed, so it was difficult to apply for industrial use.

SUMMARY OF THE INVENTION

The object of this invention is improvement of above non-convenience, especially to offer the real time quantitative stress measurement method and its apparatus for the object to be measured under applied load on the base of sound velocity or time of flight using either longitudinal or transverse waves.

The stress measurement method and its apparatus of this invention are composed to use the value of the change of time of flight measured by propagating sound through the object to be measured. The characteristic of this invention is to calculate the inherent coefficient of the material to be measured (the stress dependent coefficient $\alpha$) in advance, then the stresses of the object to be measured is concretely measured at real time on basis of above information.

Each stress measurement method of this invention is concerned to the process of calculation of real time stress occurred in the object to be measured and each of them is basically composed of 4 processes as follows:

In a first process, the time of flight $t_o$ under non-applied load and nearly non-applied one and the time of flight $t_n$ responded the stress $\sigma_n$ induced by the change of applied load are measured through the distance between one face and the another face at the determined place of measured object.

In a 2nd process, the change of time of flight $\Delta t_n = t_n - t_o$ (calculated by the plural information about the time of flight $t_o$, $t_n$, obtained by above first process. At the same time, the inherent stress dependent coefficient $\alpha$ of the measured material is calculated using the conducted formula $\alpha = f(\Delta t_n, \sigma_n)$, and the above obtained information and the elastic modulus of measured object.

In a 3rd process, before or after the 1st and the 2nd process, the time of flight for the distance between one face and another one at the determined place is measured on the object practically installed or constructed under applied unknown load. The practical time of flight t of the equipped object is also measured by the 1st process. The timing of measurement of this procedure is acceptable either before or after the 1st and 2nd process.

In a 4th process, $\Delta t (=t-t_o)$ is calculated use of the plural information obtained from each process of the 1st to 3rd, and the change of time of flight t of the object, and the stress $\sigma$ is calculated by the formula $\sigma = f(\Delta t, \alpha)$, then the real applied stress is determined for the practically equipped object.

By use of this invention, time of flight obtained for the object under non-load (1st process), the estimated stress dependent coefficient $\alpha$ (2nd process), and the measured practical time of flight (3rd process), are put into the previously determined formula $\sigma = f(\Delta t, \alpha)$. As a result, stress $\sigma$ induced in the object can be easily and rapidly obtained at the real time. Moreover time calculating $\alpha$ becomes shorter by direct use of time of flight to reduce the step of calculating ultrasonic velocity from measured propagating time.

The time of flight $t_o$ at the non-applied stress and the time of flight $t_n$ at the applied stress $\sigma_n$ in the above 1st process can be obtained by using same other part which consists of the same material as the object, or the equipped object under non-applied stress or almost non-stress.

Consequently by using same other part consisted of the same material as the object, the stress dependent coefficient $\alpha$ can be rapidly and generally obtained even in the case of the object un-removable from the equipment. In the method measuring the stress dependent coefficient $\alpha$ using the object itself, the operative efficiency can be improved because preparing some other parts consisted of the same material as the object is not required though there are some restrictions due to specifying the measurement place in some case.

In the 1st process of the stress measurement method, the ultrasonic wave is made to propagate into parallel direction to applying load to the object. In this case the formula $$\sigma = \{E/(1-\alpha)\}(\Delta t/t_o)$$

can be used as the formula to calculate the stress $\sigma$. $\sigma = f(\Delta t, \alpha)$, where $\Delta t = t - t_o$, and t is time of flight of the object under unknown load. By the way mentioned above the unknown stress $\sigma$ induced in the object can be concretely estimated from the data of the time of flight.

Moreover in the 2nd stress measurement method, formula $$\alpha = \{1 - (\Delta t_n/t_o)(E/\sigma_n)\}$$

can be adopted as the formula to obtain the stress dependent coefficient $\alpha$ (here n is number of measurements of time of flight, E is the Young's modulus of the object, same script is used below). Thus the inherent stress dependent coefficient α of the object can be concretely obtained and unknown stress induced in the object under applied load also rapidly and concretely estimated at real time on the base of measured time of flight.

Moreover in the 1st process of the stress measurement method, the ultrasonic wave is made to propagate into the vertical direction to the applying load to the object. In this case, the formula $$\alpha = -\{E/(\nu+\alpha)\} \cdot (\Delta t/t_o)$$

can be used as the formula to calculate the stress σ, σ=f(Δt, α) where ν is the poisson's ratio of the object, the same script is used below. $\Delta t = t - t_o$, and t is time of flight of the object under unknown load at the measurement place.

Thus the stress σ of the object under applied unknown load can be rapidly and quantitatively obtained at real time by use of the measured time of flight. Moreover by making ultrasonic wave propagate vertical to load applying direction in the object the setting place of ultrasonic sensor can be selected from wide range in the measurement of time of flight, so the operation efficiency is expected to improve.

In the 2nd process of the stress measurement method, the formula $$\alpha = \{-\nu - (\Delta t_n/t_o)(E/\sigma_n)\}$$

can be used to calculate stress dependent coefficient α of the object. In this case, the stress dependent coefficient α can be concretely defined under the determined condition, then the stress σ of the object under applied unknown load can be rapidly and smoothly obtained at real time as well as the stress measurement method.

In each stress measurement method, the longitudinal ultrasonic wave is used to measure the time of flight, however the transverse ultrasonic wave is also available.

The stress measurement apparatus is composed to measure the time of flight of sound propagating into the object and use the change of these data. In these cases, the basic components are a ultrasonic wave unit to measure the time of flight, a calculation unit to obtain the stress dependent coefficient α and a main calculation unit to estimate and determine the stress of the object using data of time of flight the stress dependent coefficient α and so on.

The measurement unit of the time of flight is equipped with a function to measure the time of flight t by propagating sound through one face to another one of the object at the determined place (time of flight measurement unit 1).

This unit is also equipped with a function to measure the time of flight $t_o$ by propagating sound through one face to another one of the object under applied zero-load or almost zero-load at the determined place and to measure similarly the time of flight $t_n$ by changing the load to the object (time of flight measurement unit 2).

Either longitudinal or transverse ultrasonic wave can be used to measure the time of flight. Needed load $\sigma_n$ is applied to the object by a unit separately prepared.

The unit to calculate the stress dependent coefficient is equipped with a calculation function for the formula $$\alpha = f(\Delta t_n, \sigma_n)$$

to determine the stress dependent coefficient peculiar to the object by inputting plural data of time of flight t, $t_o$, $t_n$ and the data of applied stress $\sigma_n$ corresponding with the time of flight $t_n$, a function to output plural data of time of flight $t_n$, $t_o$ (or t, $t_o$), a function to estimate the change of time of flight $\Delta t_n (= t_n - t_o)$ and a function to calculate the inherent stress dependent coefficient α from the formula $$\alpha = \{1 - (\Delta t_n/t_o)(E/\sigma_n)\}$$

by use of the data of $\Delta t_n$ and $\sigma_n$ mentioned of above.

This unit (to calculate the stress dependent coefficient) is also equipped with function to calculate the change of the time of flight $\Delta t(t - t_0)$ by use of t measured for the object under applied unknown load $t_0$ and under load of zero.

The main calculation unit is composed of a function to calculate the stress of the object practically equipped to the construction or the instrument under unknown load from previously defined formula α=f(Δt, α) by use of the information of Δt and α mentioned above.

In this stress measurement apparatus by this invention, the stress σ can be rapidly obtained at real time by calculating stress dependent coefficient α peculiar to the material of the object 1 and by measuring the change of time of flight practically propagating through the object. The stress of the object can be measured more rapidly by direct use of time of flight (no need to calculate for sound velocity from the time of flight).

In the measurement of time of flight $t_n$ and $t_0$ propagating between the defined distance can be obtained by using the object itself or the some other part consisted of the same material as the object.

In the stress measurement apparatus, the stress σ can be concretely estimated according to the formula $$\alpha = f(\Delta t, \alpha) = \{(E/(1-\alpha)\}(\Delta t/t_o)$$

by measurement of the time of flight propagated parallel to the stress $\sigma_n$ applied to the object. Such method operates similarly to the stress measurement apparatus, and also it is possible to calculate unknown stress σ of the object concretely and rapidly in response to measurement conditions.

In the stress measurement apparatus, the unit can be composed with the function to output the data of time of flight $t_n$, $t_o$ by inputting plural information including applied load $\sigma_n$, obtained by measurement of time of flight, the function to calculate the change of time of flight $\Delta t_n = t_n - t_o$ corresponding to the applied stress $\sigma_n$ and the function to determine the inherent stress dependent coefficient α using the formula $$\alpha = \{1 - (\Delta t_n/t_o)(E/\sigma_n)\} \text{ as } \alpha = f(\Delta t_n, \sigma_n).$$

By this way, it is possible to calculate the stress dependent coefficient α of the object effectively and concretely.

In the stress measurement method described above, the formula $$\alpha = (1/k) \sum_{n=1}^{k} \{1 - (\Delta t_n / t_o)(E/\sigma_n)\}$$

can be used as the formula $\alpha = f(\Delta t_n, \sigma_n)$ to calculate the stress dependent coefficient instead of the formula $$\alpha = \{1 - (\Delta t_n/t_o)(E/\sigma_n)\}.$$

Thus the stress dependent coefficient peculiar to the object can be determined.

As a result it is possible to determine the stress dependent coefficient of the object precisely and effectively and also to improve the accuracy of above value.

In the measurement apparatus, the unknown stress of the object can be obtained from the formula $$\sigma = f(\Delta t, \alpha) = -\{E/(\nu+\alpha)\} \cdot (\Delta t/t_0)$$

by use of the ultrasonic wave propagating through vertical to the load applied on the object.

Such method operates similarly to the stress measurement apparatus described above, and it is possible to improve the operative efficiency for example the place adhered with sensor can be selected in the wide range by use of the ultrasonic wave propagating vertical to the applied load.

In the stress measurement, the unit can be composed with he function to output the data of the time of flight $t_n$, $t_o$ by inputting plural information including applied stress $\sigma_n$ obtained by measurement of time of flight, the function to calculate the change of time $\Delta t_n (= t_n - t_o)$ corresponding to the applied stress $\sigma_n$, and the function to determine the inherent stress dependent coefficient $\alpha$ using the formula $$\alpha = \{-\nu - (\Delta t_n/t_o)(E/\sigma_n)\}.$$

By this way, it is possible to calculate the stress dependent coefficient $\alpha$ of the object effectively and concretely.

In the stress measurement method described above, the formula $$\alpha = (1/k)\sum_{n=1}^{k}\{-\nu - (\Delta t_n/t_0)(E/\sigma_n)\}$$

can be used as the formula $\alpha = f(\Delta t_n, \sigma_n)$ to calculate the stress dependent coefficient instead of the formula $$\alpha = \{-\nu - (\Delta t_n/t_o)(E/\sigma_n)\}.$$

Thus the stress dependent coefficient peculiar to the object can be determined.

By use of the time of flight propagating vertical to load applied to the object the stress dependent coefficient can be also determined effectively. Especially by averaging the total data of measured time of flight, it is possible to determine the inherent stress dependent coefficient rapidly and precisely and also to improve the accuracy of above value.

EFFECTS OF THE INVENTION

This invention is composed and operated described above. The time of flight or the wave velocity of the object is measured by use of longitudinal or transverse ultrasonic wave and the inherent stress dependent coefficient is determined. As the result, it is possible to obtain the stress induced in the object rapidly and quantitatively at real time by use of this stress measurement method and the apparatus.

BRIEF DESCRIPTION OF THE DRAWINGS

FIG. 5 are figures show the property of stress dependent coefficient $\alpha$ (relation between applied load and changing ratio of time of flight)

FIG. 6 are explanation of the part (test piece) consisted of the same material as the object used for the time of flight measurement in FIG. 3.

FIG. 7 shows the relation between changing ratio of time of flight ($\Delta t_n/t_o$) measured by the method in FIG. 2 for S20C steel and corresponding applied load (extension load $\sigma_n$);

DESCRIPTION OF PREFERRED EMBODIMENT

Followings is the explanation to perform this invention in the best practical application using the appended figures.

Figure 1:
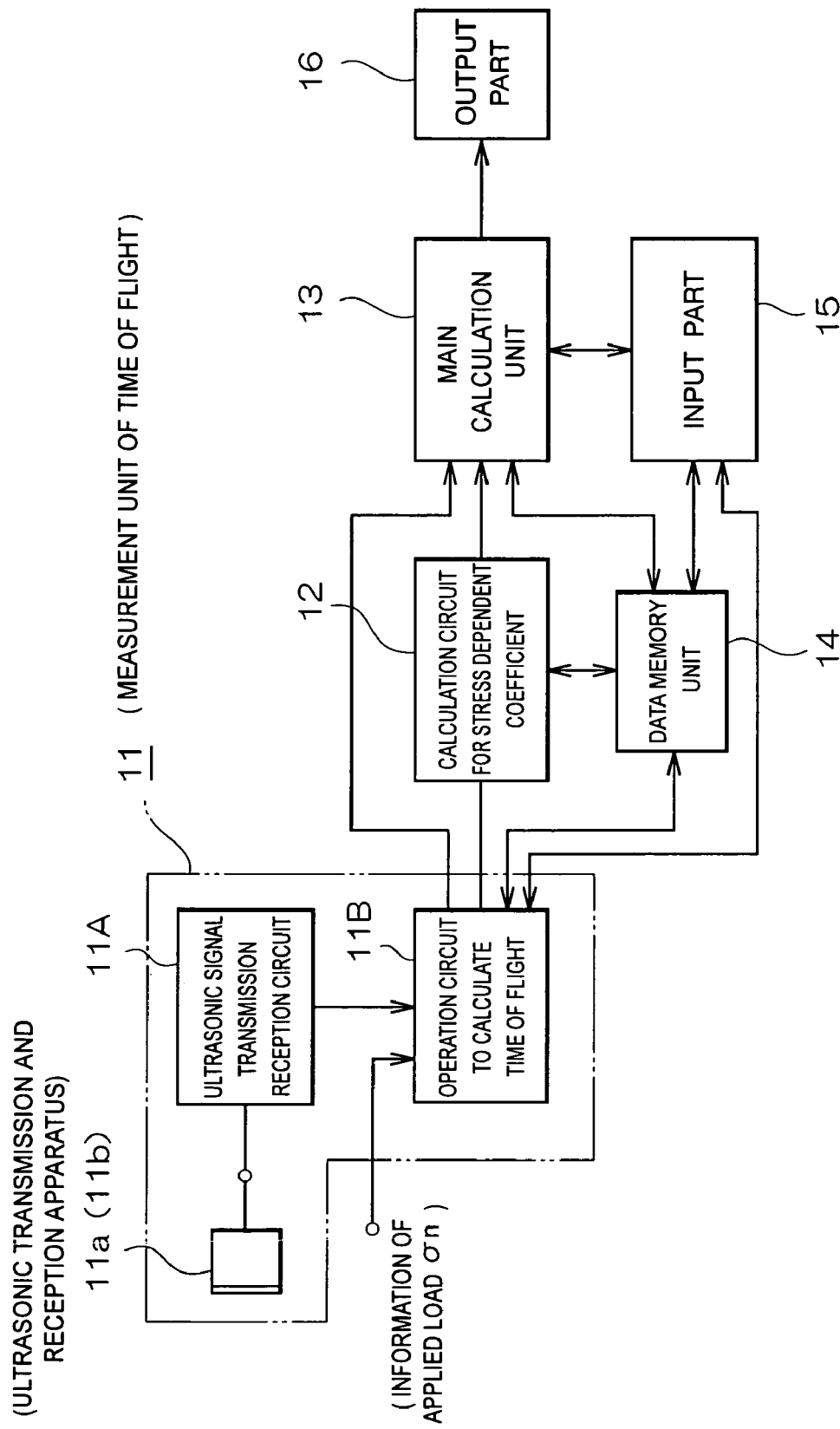
FIG. 1 is a block diagram of this invention expressed in the best form to practice.

As shown in FIG. 1, this practical application form is composed of (operation 11) the measurement unit of time of flight corresponding the change with the load applied on the object 1 or the other part 1A consisted as same material as the object 1, (operation 12) the calculation unit of the stress dependent coefficient $\alpha$ using above time of flight (the calculation circuit for stress dependent coefficient), and (operation 13) the main calculation unit of the stress $\sigma$ of the object using the data obtained from the operation 11 and 12.

The load applying apparatus 21 is also equipped in the operation 11 to measure the time of flight. In FIG. 1 mark 14 shows a memory part of information and mark 15 shows a part to input the necessary data or operation command. Mark 16 shows a part to output the data of the stress of the object 1 and print them.

The details are described in the following.

[The Measurement of the Time of Flight]

Figure 2:
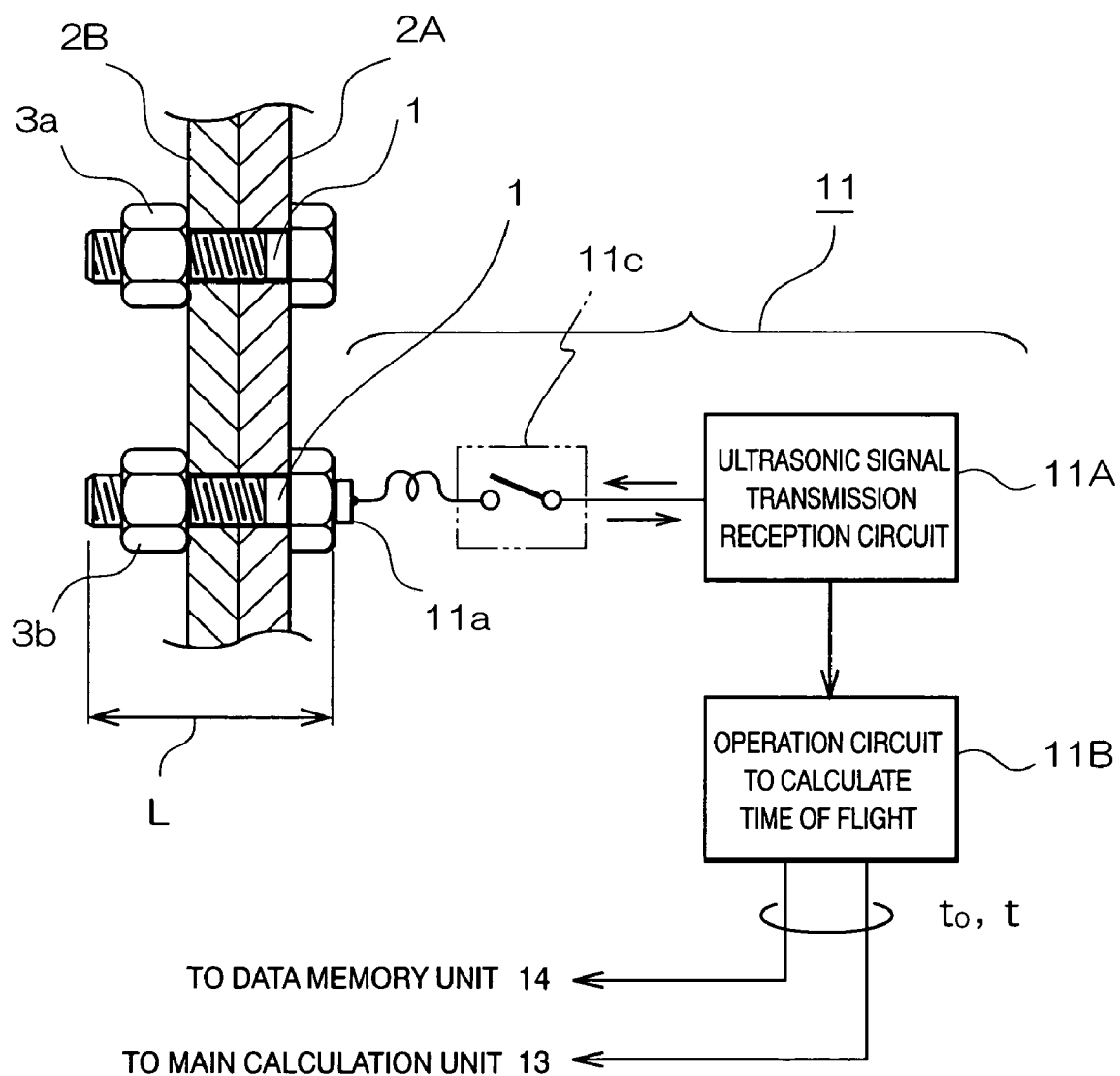
FIG. 2 is an explanation of time of flight of the object itself measured by time of flight measurement system FIG. 1.
Figure 3:
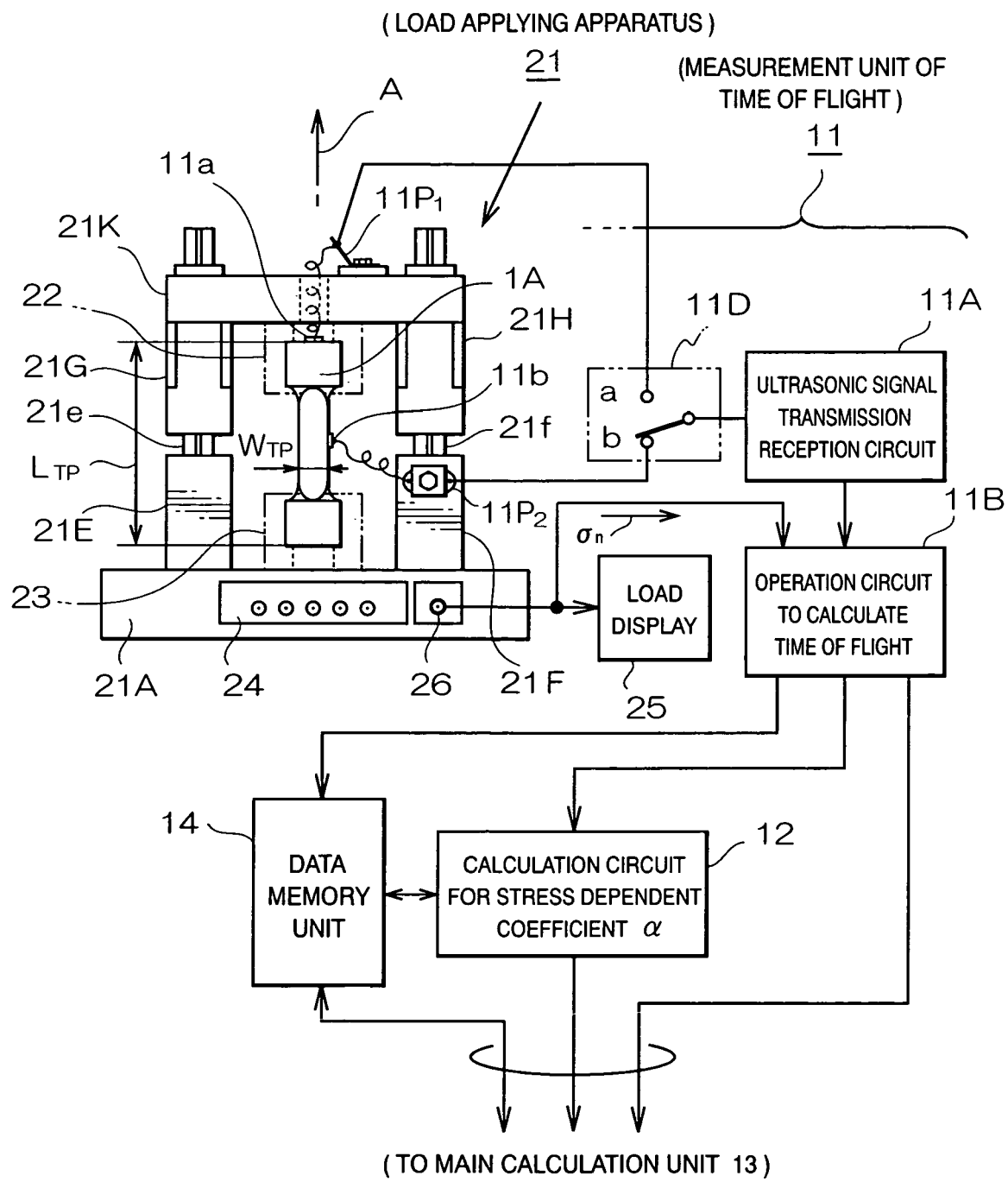
FIG. 3 is an explanation of time flight of the other part consisted of the same material) as the object measured by time of flight measurement system in FIG. 1 (by changing applied tensile load)

In FIG. 1 and FIG. 2, there are two functions in the measurement unit 11 of the time of flight; one is to measure the time t of ultrasonic wave propagating the distance L between one face and another at the determined place of the product, the material, the instrument, the construction and so on under applied unknown load, and the other is to measure the time of flight $t_o$ of ultrasonic wave propagating the distance $L_0$ between one face and another under zero load and $t_n$ of ultrasonic wave through the same distance as above under applied load (see FIG. 3)

The 1st measurement unit of the time of flight is realized by measuring the time of flight of ultrasonic wave propagating the distance L between one face and the opposite at the determined place of the product, material, instrument, construction, and so on under applied unknown load as shown in FIG. 2. Abolt is supposed as the object to be measured in FIG. 2. It connects a steel plate 2A with the other one 2B. In this case the stress in the bolt is induced with increasing of the connection force, namely unknown extension stress occurs to the direction of axis of bolt. Mark 3a and 3b show the nuts to connect two steels 2A and 2B respectively mentioned above.

In this case, the time of flight $t_0$ is measured under almost zero load by loosening the nut 3b of the bolt (the object 1 to be measured). If it is difficult to make above measurement (in the case impossible to loosen the nut), the time of flight $t_0$ under the zero load can be obtained by the data from the 2nd measurement unit of time of flight mentioned in a later chapter. The stress σ of the object 1 under applied unknown load can be estimated using the data $t_0$ $t_n$ obtained from the 1st measurement unit 11 of time of flight.

The 2nd measurement unit of the time of flight is realized for example as shown in FIG. 3 by ultrasonic wave propagating the distance $L_{TP}$ between one face and the opposite at the determined place of the object to be measured (bolt 1) or the other part 1A (test piece) consisted of the same material as the object under zero load and applied load of $σ_n$ respectively. In FIG. 3, the form of the test piece 1A is $L_{TP}$ in length, D in the diameter of both ends and $W_{TP}$ in width of central part. In this case, the cylindrical part of both ends is about ⅕ $L_{TP}$ and the square of central part is about ⅖ $L_{TP}$. The section of central part in the test piece 1A is square, but rectangular form is also usable.

The determined distance of propagating ultrasonic wave is $L_{TP}$ parallel to the direction of applied load in FIG. 3 and the time of flight can be measured at any point of the length. By the calculation unit of stress dependent coefficient α of the object 1 can be estimated using the data of $t_n$ and $t_0$ obtained from the measurement unit 11 of the time of flight.

As shown in FIG. 1 to FIG. 3, the measurement unit 11 of the time of flight is equipped with the receiver 11a or 11b to receive the reflection wave from the end of the object 1 or the other part 1A consisted of the same material as the object 1 by propagating the ultrasonic wave of defined frequency, the electric transmission and reception circuit 11A to output the timing of received reflection ultrasonic wave as the information of time of flight, and the operation circuit 11B to calculate time of flight of wave from transmission to reception using input of the time of flight obtained from 11A. 11D shows the switch to connect the 11a or 11b with 11A.

Here, the receiver 11a operates to transmit and receive the ultrasonic wave propagating parallel to the applied stress $σ_n$, and 11b operates for the wave perpendicular to the applied stress $σ_n$. The operation circuit 11B is also equipped with the arrangement unit for inputting the data of stress $σ_n$ applied on the other part 1A by the load applying unit 21, mentioned later, and gathering the data of time of flight $t_0$, $t_1$, $t_2$, $t_3$ ... $t_k$ corresponding to above load (including zero load).

It is difficult to measure time of flight $t_0$ under zero load for the object 1 practically equipped in the high pressure plant or the bridge (this is in the condition of applied some load). In this case, the test piece 1A having the length $L_{TP}$ as same as L of the object 1 can be used to measure $t_0$ under zero load. On the other hand, in the case of L±$L_{TP}$, time of flight $t_0$ through the length $L_{TP}$ of the test piece 1A under zero load is proportionally inserted to the time of flight $t_0$ of the object 1 under zero load ($t_0$ under zero load is obtained corresponding $t_0$ the length $L_{TP}$ from one face to another). Above calculation is operated with the time of flight conversion function of the calculation circuit 11B in the time of flight measurement unit 11. These are operated according to the order from the input apparatus 15 mentioned later. The data of the length L from one face to another of the object 1 and of the length $L_{TP}$ from one face to another of the other object 1A consisted of the same material as the object 1 are memorized in the data memory apparatus 14 mentioned later.

In the time of flight measurement unit 11, other part 1A consisted of the same material as the object 1 is used to obtain the time of flight $t_n$ corresponding to applied load $σ_n$ necessary to calculate the stress dependent coefficient α as an example. The object in FIG. 2 can be directly set (with removed from the equipped part temporally) on the load applying unit 21 shown in FIG. 3 to obtain above data.

The object 1 before equipped to the construction can be also directly set on the load applying unit 21 shown in FIG. 3 before equipped to the construction in order to obtain the stress dependent coefficient α previously using formula (5) or (10) described later.

[Setting Method of Applied Load]

In this operation, the load applying apparatus 21 is also set up as an annex of the measurement unit of time of flight 11 (see FIG. 3). By use of this apparatus 21, it is possible to change extension load applied to the object itself or the other part 1A consisted of the same material as the object at measurement of time of flight.

This load applying apparatus 21 makes some stress in the part 1A (test piece) consisted of the same material as the object mentioned before by applying defined stress $σ_n$ continuously or changing step by step at measurement of time of flight. Here, defined stress occurs in the object (or other part 1A) with applied load. Generally the value of a occurred in the object (or other part 1A) is treated as almost same as the value of applied stress $σ_n$.

The explanation of the load applying apparatus 21 is as follows; In FIG. 3, this apparatus 21 is equipped with a base plate 21A, two guide support 21E, 21F set on the base plate 21A at the interval of defined distance, movable parts 21G, 21H, movable along guide supporters 21e, 21f, a mechanism 22 holding one end of sample by hanging at the central part of a beam 21K and a mechanism 23 holding another end of sample arranged against the mechanism 22. The lower end of mechanism 23 is fixed on the base plate 21A.

The sample holding mechanisms 22, 23 are arranged on the same central axis respecting to move up or down integrally without shift of axis even in the case that the parts 21G, 21H move up and down. Here $11P_1$ shows the relay terminal of ultrasonic transmission and $11P_2$ shows that of the apparatus 11b.

The base part 21A is equipped with the unit to apply load up and down on the beam 21K (not shown). This up and down loading unit operates with oil pressure driving mechanism, and applies extension stress $σ_n$ continuously or step by step on the part 1A etc through the each of sample holding mechanisms 22, 23. An operation controller 24 to control up and down loading unit externally and a load display 25 to show the value of extension load applied on the other object 1A are equipped in the base part 21A. Mark 26 shows the output terminal of the information of load.

The settled load can be optionally applied to the direction A in FIG. 3 against the beam supporter 21K by control of the up and down loading unit through the control unit 24. By this way, the settled extension load is continuously or step by step applied on the other part 1A hold with the sample holding mechanism 22, 23, and then output as $σ_n$.

In this case, the extension load is settled supposing the measurement of time of flight by the measurement unit 11. The time of flight of the other part (test piece) $t_n$ is measured by changing load $σ_n$ step by step, for example time of flight is $t_0$ for under zero load, and is $t_n$ for the stress $σ_n$(n=1, 2 ... k). The loading unit 21 mentioned above can be used for not only extension but also compression. The oil pressure mechanism is used to generate load in the above loading unit 21, but other generation unit can be also used if it operate similarly.

[On the Calculation of Stress Dependent Coefficient]

Mark 12 in FIG. 1 shows the calculation circuit for stress dependent coefficient, this circuit 12 is composed of the units to input $\sigma_n$ corresponding to time of flight $t_n$(n=1, 2 . . . k), to output $t_0$, $t_n$ to calculate the change of time of flight $\Delta t_n$(=$t_n$-$t_0$) and then to calculate stress dependent coefficient $\alpha$ of the object 1 using the formula $\alpha$=f($\Delta t_n$-$t_0$).

This circuit 12 is equipped with the unit to calculate the changing ratio of time of flight $\Delta t_n/t_0$, where $t_0$ is time of flight at $\sigma_n$=0.

The data memory unit 14 equipped separately memorizes the calculated stress dependent coefficient $\alpha$, the data used for it, and the data of time of flight arranged and calculated by the circuit 11B.

The following is the detail of this invention to obtain stress dependent coefficient $\alpha$ using formula $\alpha$=f($\Delta t_n$, $\sigma_n$).

[The Case of Propagating Ultrasonic Wave Perpendicular to the Direction of Applied Load]

The function of time of flight $t_n$ of longitudinal ultrasonic wave can be shown $$t_n = W_{TP}(1-\sigma_n \nu/E)/V_0(1+\alpha_{T2}\sigma_n/E) \qquad (1)$$

where $W_{TP}$ is wave propagating distance shown in FIG. 3 (in case of zero load).

Equation 1 can be applied to the measurement of time of flight using ultrasonic wave transmission and reception apparatus 11b in FIG. 3. A numerator in equation (1) shows the transverse length, so the value of this numerator decreases with the increase of extension stress (load). $V_0$ is ultrasonic sound velocity of the object under zero load. $\sigma_n/E$ is strain in longitudinal direction (from equation $\sigma$=E·$\epsilon$), $\nu$ is poisson's ratio of the object and E is Young's modulus. Strain in transverse direction can be obtain by multiplying longitudinal strain $\epsilon$ by poisson's ratio $\nu$. $\alpha_{T2}$ is stress dependent coefficient of the material of the object.

A denominator in equation (1) shows longitudinal wave velocity. By expanding equation (1) and partially replacing by ignorance of minute term, and from $$\alpha_{T2}\sigma_n/E \ll 1,\ E > \sigma_n,\ W_{TP}/V_0 = t_0$$

following equation (2) can be obtained, $$t_n \approx t_0\{1-(\sigma_n/E)(\nu+\alpha_{T2})\} \qquad (2)$$

and from equation (1)

$$t_n/t_0 - 1 = \Delta t_n/t_0 = -(\sigma_n/E)(\nu+\alpha_{T2}) \qquad (3)$$

Using equation (3)

$$\alpha = \alpha_{T2} = -\nu - (\Delta t_n/t_0)(E/\sigma_n) \qquad (4)$$

can be obtained as $\alpha$=f($\Delta t_n$, $\sigma_n$) where n is measurement number of time of flight. The time of flight $t_1$, $t_2$, $t_3$ . . . $t_k$ are measured at each stress of $\sigma_1$, $\sigma_2$, $\sigma_3$ . . . $\sigma_n$ in FIG. 3.

If measurement is performed in high accuracy, the same stress dependent coefficient $\alpha_{T2}$ can be calculated using equation (4) for any data of time of flight on the base of $t_0$ at zero stress.

The error is unavoidable to the measurement value, so in many cases stress dependent coefficient $\alpha$ is estimated using equation (5) (or other similar method) by averaging total measurement values to minimize the error,

[Math 3]

$$\alpha = \alpha_{T2} = (1/k)\sum_{n=1}^{k}\{-\nu - (\Delta t_n/t_0)(E/\sigma_n)\} \qquad (5)$$

the calculation of stress dependent coefficient $\alpha_{T2}$ is described in detail below.

[The Case of Propagating Ultrasonic Wave Parallel to the Direction of Applied Load]

The function of time of flight $t_n$ of longitudinal wave in this case is shown in following equation (at zero load)

$$t_n = L_{TP}(1+\sigma_n/E)/V_0(1+\alpha_{T1}\sigma_n/E) \qquad (6)$$

Equation (6) can be applied to the measurement of time of flight using ultrasonic wave transmission and reception apparatus 11a in FIG. 3. A numeration in equation (6) shows the longitudinal length, so the value of numerator increases with the increase of the applied stress.

A denominator in equation (6) shows longitudinal wave velocity. By expanding equation (6) and neglecting the minute term, then partially replacing and from $$\alpha_{T1}\sigma_n/E \ll 1,\ E > \sigma_n,\ L_{TP}/V_0 = t_0$$

following equation (7) can be obtained, $$t_n \approx t_0[(1+\sigma_n/E)/(1-\alpha_{T1})] \qquad (7)$$

From equation (7)

$$(t_n/t_0)-1 = \Delta t_n/t_0 = (\sigma_n/E)(1-\alpha_{T1}) \qquad (8)$$

Using equation (8)

$$\alpha = \alpha_{T1} = 1 - (\Delta t_n/t_0)(E/\sigma_n) \qquad (9)$$

can be obtained as $\alpha$=f($\Delta t_n$, $\sigma_n$) in order to calculate the stress dependent coefficient $\alpha$. From the similar reason described in equation (4) the stress dependent coefficient $\alpha$ is obtained using the averaged results of total measurement values to minimize the error in equation (9)

[Math 4]

$$\alpha = \alpha_{T1} = (1/k)\sum_{n=1}^{k}\{1 - (\Delta t_n/t_0)(E/\sigma_n)\} \qquad (10)$$

The calculation of stress dependent coefficient $\alpha_{T1}$ is described in detail below.

The equation to calculate $\alpha$ for the same material differs with the measurement method as mentioned above.

[Main Calculation Unit (Especially the Equation to Calculate the Stress)]

In the main calculation unit 13 in FIG. 1, the stress a induced in the object practically equipped on the instrument or the construction under applied unknown load can be calculated using the previously defined equation $\sigma$=f($\Delta t$, $\alpha$), where $\Delta t$=t-$t_0$, and t is time of flight through determined distance of the object 1 under unknown load.

The main calculation unit operates on the base of $\alpha_{T2}$ (or $\alpha_{T1}$) obtained from the stress dependent coefficient calculation circuit 12 and the plural data of time of flight obtained from the time of flight measurement method mentioned before and then calculates the stress of the object under applied unknown load.

In the equation $\sigma=f(\Delta t, \alpha)$, it is the premise to be clearly determined for $\alpha_{T2}$ of the object 1 beforehand. In this case time of flight propagating through the object 1 is measured using ultrasonic wave to collect information concerning unknown stress $\sigma$. Here the equation $\sigma=f(\Delta t, \alpha)$ differs with the case of the sound direction propagating parallel or perpendicular to direction of occurred stress. Such difference is caused by the change of path length of sound with stretching along the tensile direction or shrinking perpendicular to it.

The different equations are used in the case of measurement of time of flight of sound propagating parallel or perpendicular to applying direction of unknown load.

Following is the detailed explanation.

[In the Case of Ultrasonic Wave Propagating Perpendicular to Applying Direction of Unknown Load]

The function related to time of flight t of longitudinal wave is shown in the following equation in similar way to equation (1) to estimate $\sigma_{T2}$ mentioned before.

$$t=W(1-\sigma v/E)/V_0(1+\alpha_{T2}\sigma/E) \quad (11)$$

Equation 11 corresponds to the case of measurement of time of flight of the object under applied unknown load using ultrasonic wave transmission and reception apparatus 11b in FIG. 3. The numerator of equation (11) shows the distance in transverse direction. W (not shown in the figure) is the ultrasonic propagating distance in transverse direction under zero load (it corresponds to mark W in FIG. 6).

$\alpha_{T2}$ is stress dependent coefficient, $\sigma$ is unknown stress occurred in the object 1. Other marks are same as in equation (1).

The denominator of equation (11) shows the velocity of longitudinal wave. By expanding equation (11), neglecting the minute term, and partially replacing, equation (12) can be obtained from $\alpha_{T2}\sigma/E<<1$, $E>\sigma$, $W/V_0=t_0$ $$t\approx t_0\{1-(\sigma/E)(v+\rho_{T2})\} \quad (12)$$

then $(t/t_0)-1=\Delta t/t_0=-(\rho/E)(v+\alpha_{T2}) \quad (13)$

Using equation (13)

$$\sigma=-\{E/(v+\alpha_{T2})\}\cdot(\Delta t/t_0) \quad (14)$$

can be obtained as the function $\sigma=f(\Delta t, \alpha)$ to calculate unknown stress $\sigma$.

Using this way, unknown stress $\sigma$ of the object 1 even unknown applied load can be quantitatively and rapidly calculated at real time by measuring practical time of flight t (on the premise that stress dependent coefficient $\alpha_{T2}$ of inherent constant of the material of this object is already determined).

<In the Case of Ultrasonic Wave Propagating Parallel to Applying Direction of Unknown Load>

The function related to time of flight t of longitudinal wave is shown in the following equation in similar way to equation (6) to calculate stress dependent coefficient $\alpha$, $$t=L(1+\sigma/E)/\{V_0(1+\alpha_{T1}\sigma/E)\} \quad (15)$$

where L (not shown in FIG.) is distance of sound propagating to perpendicular direction in the object 1, $\alpha T_1$ is stress dependent coefficient of the object 1, $\sigma$ is unknown stress occurred in the object 1. Other marks are same as those in equation (1).

Equation (15) corresponds to the case of measurement of time of flight using ultrasonic wave transmission and reception apparatus 11a in FIG. 3. The numerator of (15) shows longitudinal distance, so it increases with the increase of stress (applied load).

The denominator of equation (15) shows the velocity of longitudinal wave.

By expanding equation (15), neglecting the minute term, partially replacing, equation (16) can be obtained from $\alpha_{T1}/E<<1$, $E>\sigma$, $L/V_0=t_0$, $$t_n\approx t_0\{1+\sigma/E)(1-\sigma_{T1})\} \quad (16)$$

From equation (16)

$$(t/t_0)-1=\Delta t/t_0=(\sigma/E)(1-\sigma_{T1}) \quad (17)$$

From equation (17) equation (18) can be obtained as the function $\sigma=f(\Delta t,\alpha)$ to calculate unknown stress $\sigma_{T1}$, $$\sigma=\{E/(1-\sigma_{T1})\}\cdot(\Delta t/t_0) \quad (18)$$

Using equation (18), unknown stress $\sigma$ of the object even under applied unknown load can be quantitatively and rapidly calculated at real time by measuring the practical time of flight t (on the premise that stress dependent coefficient $\alpha_{T1}$ peculiar to the material of this object is already determined)

Total operation and function in practice are explained as follows. In this practice, stress dependent coefficient $\alpha$ peculiar to the material of the object 1 is determined at first, then stress $\sigma$ of the object 1 under applied unknown load is obtained using equation, $\sigma=f(\Delta t,\alpha)$. In this case of calculation of stress dependent coefficient $\alpha$, either object 1 or the other part 1A consisted of same material as the object 1 can be used. In this practice, the latter is used.

The data of time of flight of the material measured under many conditions is necessary to obtain stress dependent coefficient $\alpha$. Therefore above composition is operated in the following steps to calculate $\alpha$ using collected many data and then to obtain stress $\sigma$. As mentioned before, the equations to calculate $\alpha$ and $\sigma$ differs with the measurement condition of time of flight. So the total operation of the apparatus is explained at first using FIG. 1 to 4, then detail operation caused by the difference of measurement condition is explained.

At first stress dependent coefficient $\alpha$ is measured. As shown in FIG. 3, time of flight of sound propagating the distance from one face to another of the object 1 and the other part 1A consisted of the same material as the object 1 is measured. The measurement of time of flight is performed using the ultrasonic transmission and reception apparatus 11b (or 11a), the electric signal transmission and reception circuit 11A to drive it, and the time of flight calculation circuit 11B. Switch 11D selects ultrasonic transmission and reception apparatus 11b through terminal b or 11a through terminal a. In this case switch 11D is ordered by input system 15.

Figure 4:
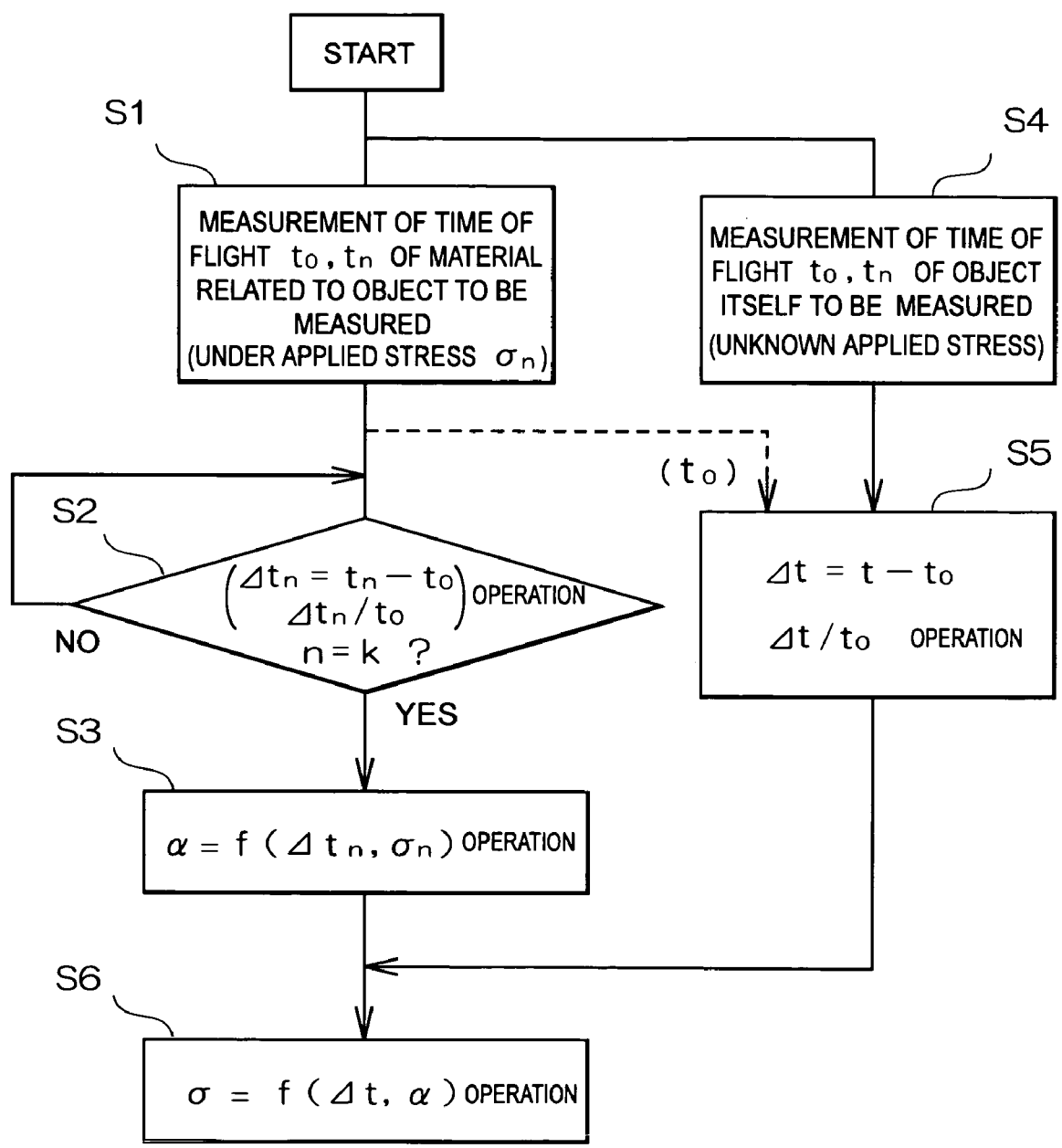
FIG. 4 is a flow chart of whole apparatus practically operated in FIG. 1.

The data obtained from this electric signal transmission and reception circuit 11A is sent to time of flight calculation circuit 11B as information concerning to time of flight of sound, then $t_0$, $t_n$ are calculated (FIG. 4 step S1). In above calculation system 11, time of flight $t_0$ of the other part 1A under zero or almost zero load ($\sigma_0$) and time of flight $t_n$ under n times changed load $\sigma_n$ are measured each time using ultrasonic wave (the step 1). Time of flight $t_n$ is measured k times corresponding to changed load $\sigma_n$ (n=1, 2, 3 . . . k). The distance $W_{TP}$ at central part of other object 1 in FIG. 3 (its section is square) is fixed as flight distance of sound to obtain time of flight $t_0$, $t_n$. Time of flight in this distance is measured by multiple reflection method and so on.

The change of time of flight $\Delta t_n (= t - t_0)$ and changing ratio of time of flight $\Delta t_n / t_0$ are calculated k times every measurement using $t_0$, $t_n$ obtained from step 1 (FIG. 4 step S2). Then stress dependent coefficient $\alpha$ peculiar to the object is obtained from the definite formula $\alpha = f(\Delta t_n, \sigma n)$ using above mentioned data and Young's modulus of the material of the object 1 (step 2).

This calculation is operated by the stress dependent coefficient calculation circuit 12 (FIG. 4 step S3).

In the case of ultrasonic wave propagating perpendicular to direction of applied load $\sigma_n$ using ultrasonic wave transmission and reception apparatus 11b in FIG. 3, $$\sigma = \alpha_{T2} = -v - (\Delta t_n / t_0)(E/\sigma_n) \quad (4) \text{ or [equation 5]}$$

[Math 5]

$$\alpha = \alpha_{T2} = (1/k) \sum_{n=1}^{k} \{-v - (\Delta t_n / t_0)(E/\sigma_n)\} \quad (5)$$

is used as formula $\alpha = f(\Delta t_n, \sigma_n)$ at the measurement of time of flight.

On the other hand in the case of ultrasonic wave propagating parallel to direction of applied load $\sigma_n$, $$\alpha = \alpha_{T1} = 1 - (\Delta t_n / t_0)(E/\sigma_n) \quad (9) \text{ or [equation 6]}$$

[Math 6]

$$\alpha = \alpha_{T1} = (1/k) \sum_{n=1}^{k} \{1 - (\Delta t_n / t_0)(E/\sigma_n)\} \quad (10)$$

is used as described before.

Time of flight can be measured for the ultrasonic wave propagating either direction parallel or perpendicular to applied load and stress dependent coefficient $\alpha$ of the object can be quantitatively and rapidly obtained using these data.

In this point, it is usable for practical application. In the case that stress dependent coefficient $\alpha$ peculiar to the material of the object is measured using other part consisted of the same material as the object, stress dependent coefficient $\alpha$ can be rapidly obtained using other object even in the case irremovable from the equipped parts. Therefore this is more practically useful. In the case that stress dependent coefficient $\alpha$ is measured using the object itself, calculation can be operated more rapidly because the preparation of the other part consisted of same material as the object is not necessary but there is some restriction in case unable to specify the measurement place of the object.

Here, many data ($\sigma_n$, $t_n$, $t_0$, $\Delta t_n$, $\Delta t_n / t_0$) and the formula $\alpha = f(\Delta t_n, \sigma_n)$ and so on are memorized in the data memory apparatus 14 beforehand or newly memorized according to demand.

Before or after step 1 and 2 mentioned above, time of flight of sound propagating through the fixed distance from one face to another is measured on the object 1 installed to the instrument or the construction under applied unknown load (Step 3). In this case the measurement of time of flight t is repeated until the data has reproducibility because they are information of time of flight under applied unknown load and stress $\sigma$ of the object 1 is estimated using these data. Above measurement is performed with time of flight calculation system 11 (see FIG. 2). Time of flight $t_0$ under zero or almost zero load is measured simultaneously. When it is impossible to measure $t_0$ (in the case of $\sigma_n \square 0$), the data of $t_0$ obtained from FIG. 3 can be used as $t_0$ of the object 1 (at $\sigma_n \approx 0$) by proportionally estimating it to the distance. These calculation are performed using time of flight calculation circuit 11B ordered by input system 15 FIG. 4 set S4).

As shown in FIG. 3, time of flight t, $t_0$ of the object in step 3 are measured in the different range from those of $t_n$, $t_0$ in the step 1 mentioned before. In this case, timing of measurement is available either before or after step 1 and 2. Time of flight t obtained by step 3 and that of $t_0$ under zero or almost zero) load, the change of them $\Delta t (= t - t_0)$, and changing ratio $\Delta t / t_0$ are calculated using time of flight calculation circuit 11B (FIG. 4, step S5) in the similar way to step 2 mentioned before. The results of $\Delta t, \Delta t / t_0$ are memorized in the data memory apparatus 14 and directly sent to the main calculation system 13.

The stress $\sigma$ of the object 1 practically installed under applied unknown load can be determined from formula $\sigma = f(\Delta t, \alpha)$ ($\Delta t = t - t_0$) using the data obtained from step 1 to 3 (step 4).

This stress $\sigma$ is calculated by main calculation system 13. In the system 13, stress dependent coefficient $\alpha$ calculated by stress dependent calculation circuit 12 and measurement data of t, $t_0$ and so on of the object 1 are input, then stress of the object 1 under applied unknown load can be obtained using the formula mentioned before (FIG. 4, step S6). Here, in the measurement of time of flight of sound propagating perpendicular to applied stress using ultrasonic wave transmission and reception apparatus 11b in FIG. 3, $$\sigma = -\{E/(v + \alpha_{T2})\} \cdot (\Delta t / t_0) \quad (14)$$

can be used as the formula $\sigma = f(\Delta t, \alpha)$ concerning to the stress of the object 1.

In the measurement of time of flight of sound propagating parallel to applied unknown load using ultrasonic wave transmission and reception apparatus 11a in FIG. 3, $$\sigma = \{E/(1 - \alpha_{T1})\} \cdot (\Delta t / t_0) \quad (18)$$

is used. In this practice, time of flight is measured to make sound propagate to parallel to the applied unknown load, so the equation (18) is used as the formula $\sigma = f(\Delta t, \alpha)$ concerning to stress of the object 1.

This practice is composed and operated as mentioned above. By this method, stress dependent coefficient $\alpha$ and stress $\sigma$ practically caused in the object 1 can be obtained at real time by determining the stress dependent coefficient $\alpha$ peculiar to the material of the object 1 and by using the change of time of flight $\Delta t$ of the practical object. Moreover by this practice measurement data of time of flight can be directly used (it is unnecessary to calculate velocity from of flight), so the stress $\sigma$ of the object under applied unknown load can be quantitatively and rapidly estimated. This stress measurement method and its apparatus are superior in these points.

[Practical Example]

In above described practice to obtain the stress $\sigma$ of the object under applied load it is important to determine the stress dependent coefficient α peculiar to material of the object accurately and rapidly before measurement. A concrete example to determine stress dependent coefficient α is described here. At first time of flight is measured by the method shown in FIG. 3 and then stress dependent coefficient α of the object is estimated using equations (4), (5), (9), (10). The explanation is as follows.

[Calculation of Stress Dependent Coefficient α]

(1) In the case of ultrasonic wave propagating perpendicular to applied load, stress dependent α is $$\alpha = \alpha_{T2} = -\nu - (\Delta t_n/t_0)(E/\sigma_n) \quad (4)$$

Equation (4) is rewritten to Y=aX±b, and represented in X-Y co-ordinates.

Then it is confirmed that stress dependent coefficient α is constant or not.

From equation (4)

$$E(\Delta t_n/t_0) = -(\nu+\alpha)\sigma_n \quad (4a).$$

Figure 5A:
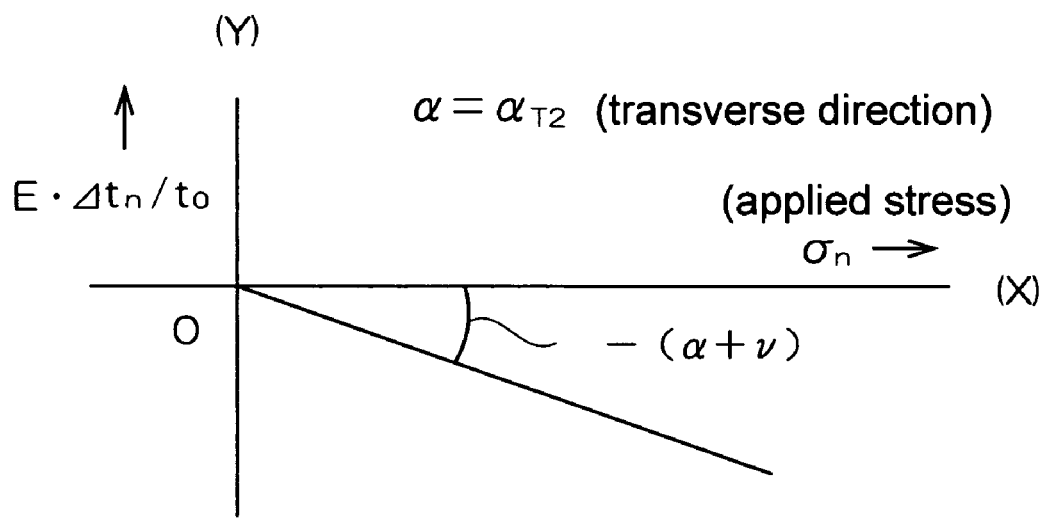
FIG. 5(A) is for the case of ultrasonic wave propagating transverse direction and FIG. 5(B) is for that propagating longitudinal direction.

Supposing x-y co-ordinates, by plotting left side of equation (4a), $E(\Delta t_n/t_0)$ on the Y co-ordinates axis and $\sigma_n$ on the X co-ordinates axis, a curve can be obtained as shown in FIG. 5(A). It is clear from FIG. 5(A) that "$-(\nu+\alpha)$" is a direction coefficient. ν is poisson's ratio, and the stress dependent coefficient α consists of second and third order elastic modulus. Therefore the value of $-(\nu+\alpha)$ is peculiar to the material. More measurements of α for many practical materials are desirable as the subject for a future study.

(2) In the case of ultrasonic wave propagating parallel to applied load, stress dependent coefficient α is $$\alpha = \alpha_{T1} - (\Delta t_n/t_0)(E/\sigma_n) \quad (9).$$

Equation (9) is rewritten to Y=aX+b, and represented in X-Y co-ordinates.

Then it is confirmed that stress dependent coefficient α is constant or not.

From equation (9)

$$E(\Delta t_n/t_0) = (1-\alpha)\sigma_n \quad (9a).$$

Figure 5B:
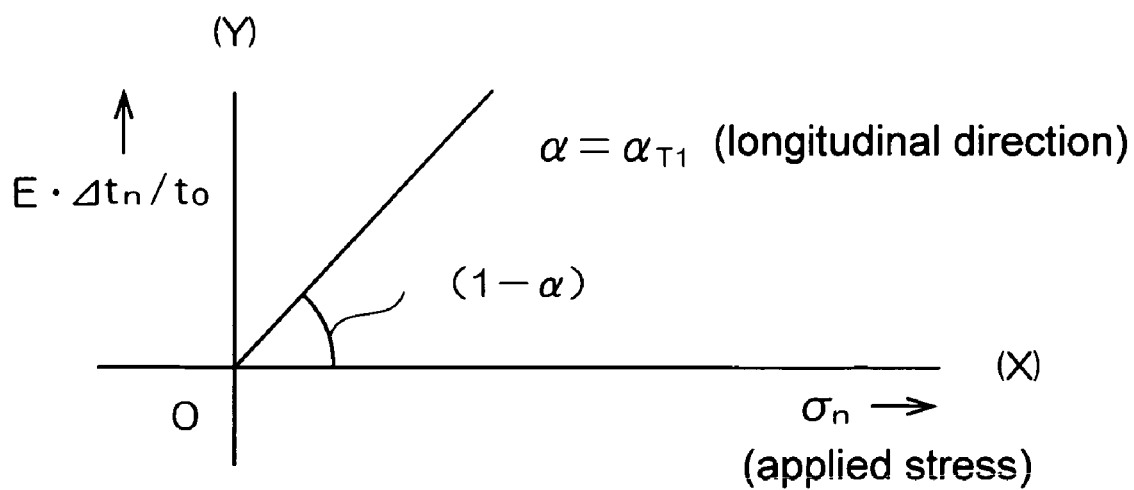

In a similar manner to (4a) mentioned above, supposing X-Y co-ordinates, by plotting left side of equation (9a), $E(\Delta t_{n/t0})$ on the Y co-ordinates axis and $\sigma_n$ on the X co-ordinates axis, the curve can be obtained as shown in FIG. 5(B). From FIG. 5(B), it is clear that $[(1-\alpha)]$ is a direction coefficient. The stress dependent coefficient α consists of second and third elastic modulus. Therefore the value of $(1-\alpha)$ is peculiar to the material. More measurements of α for many practical material are desirable as the subject for a future study.

[The relation of "$\Delta t_n/t_0$" to "$\sigma_n$" in the equation to calculate stress dependent coefficient α]

(1) Measurement Condition.

Figures 6A, 6B:
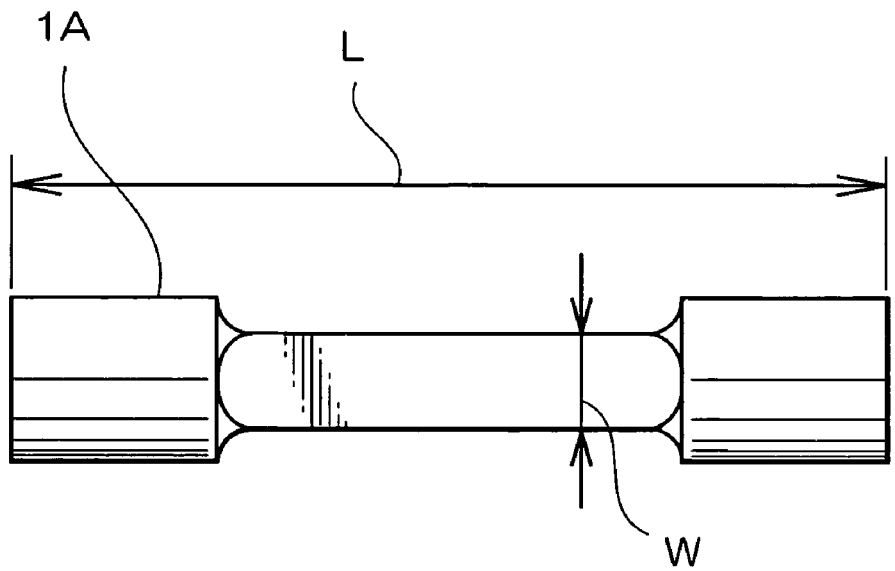
FIG. 6(A) shows the form and dimensions of the test piece and FIG. 6(B) shows the Young's modulus of this test piece.

Dimension and form of the part consisted of same material as the object 1 are shown in FIG. 6(A). It is precisely formed to 180 mm in length, rectangle of 30 mm×15 mm in central part. S 20C steel was used as the material. Young's modulus E and so on of S20C steel are shown in FIG. 6(B).

(2) Graphical Drawing

The relation of "$\Delta t_n/t_0$" to "$\sigma_n$" is shown in FIG. 7. In this FIG. 7, values of "$\Delta t_n/t_0$" in column represented as "transverse direction" are obtained from time of flight propagating perpendicular to the applied load $\sigma_n$ and these in column represented as "longitudinal direction" are obtained from time of flight propagating parallel to the applied load. In this case, time of flight $t_n$ is measured by changing applied load $\sigma_n$ as much as 5.44 MPa and then $\Delta t_n = t_n - t_0$, $\Delta t_n/t_0$ are calculated.

Figure 8A:
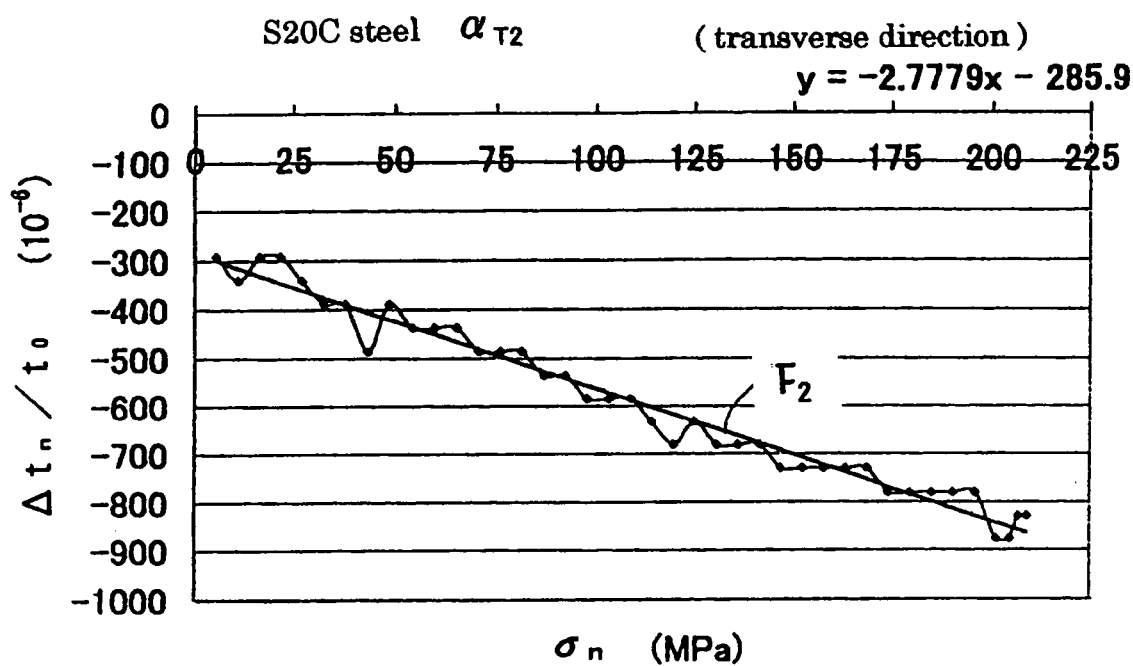
FIG. 8 show graphs to obtain stress dependent coefficient $\alpha$ from the information of direction coefficient (average of measurement values) by propagating sound transverse direction (FIG. 8(A)), and longitudinal direction (FIG. 8(B)).

Graphical Drawing (3) The relation of "$\Delta t_n/t_0$" to "$\sigma_n$" is shown in FIG. 8. FIG. 8(A) is the case of ultrasonic wave propagating perpendicular to the applied load and is drawn using the data listed in the column represented as "transverse direction". In this FIG. 8(A), each of dots shows pair data of $\sigma_n$ and $\Delta t_{n/t0}$. Connecting these dots, a zigzag line is obtained. The line F2 as the results obtained by a least squares method of data of $\sigma_n$ and $\Delta t_n/t_0$ goes from left up to right down as shown in FIG. 8(A). The line F2 obtained from measurement data in FIG. 8(A) corresponds to that of FIG. 5(A).

Figure 8B:
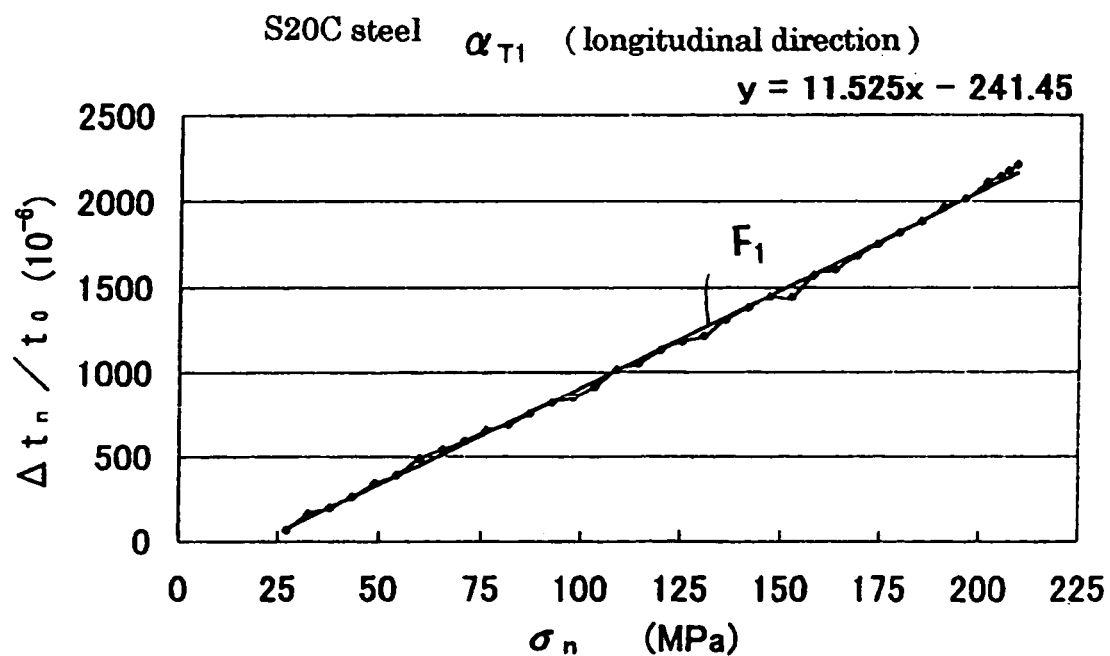

FIG. 8(B) is the case of ultrasonic wave propagating parallel to the applied load and the data corresponds to these in column represented as "longitudinal direction" in FIG. 7. Connecting these dots, a zigzag line is obtained. The line F1 as the results obtained by a least squares method of data of $\sigma_n$ and $\Delta t_n/t_0$ goes from left down to right up as shown in FIG. 8(B). The line F1 obtained from measurement data in FIG. 8(B) corresponds to that of FIG. 5(B). The direction coefficient is plus in this FIG. 8(B). The inclined lines $F_2$, $F_1$ obtained from FIG. 8(A), (B) show empirical equations (linear equation) as average of measurement data.

(4) Calculation Example of Stress Dependent Coefficient α of S20C Steel 4-1) In the Case of Calculation of $\alpha_{T2}$ (Refer to FIG. 8(A))

An empirical equation (4b) (linear equation) is obtained as the entire tendency of measurement data (a line corrected by a least squares method)

$$y = -2.7779x - 285.9 \quad (4b)$$

Corresponding equation (4b) to the equation (4a), $$\text{direction coefficient} = dy/dx = -2.7779 = (\Delta t_n/t_0)/\sigma_n \quad (4c)$$

From FIG. 6(B), Young's modulus and Poisson's ratio of S20C steel are $$E = 206783 \text{ MPa}, \nu = 0.2885 \quad (4d)$$

From (4c), (4d) and equation (4)

$$\begin{aligned}\alpha &= \alpha_{T2} \\ &= -\nu - E(\Delta t_n/t_0)/\sigma_n \\ &= -0.2885 - 206783 \times (-2.7779) \times 10^{-6} \\ &= 0.286\end{aligned} \quad (4e)$$

The stress dependent coefficient α of S20C steel is 0.286 in the case of ultrasonic wave propagating perpendicular to the applied load. The stress dependent coefficient α calculated from equation (5) is similar to that obtained from equation (4e).

Substituting obtained stress dependent coefficient α and Young's modulus of S20C into equation (14), $$\begin{aligned}\sigma &= \sigma_{T2} \\ &= -\{E/(\nu + \sigma_{T2})\} \cdot (\Delta t/t_0)\end{aligned} \quad (4f)$$

$$= -\{206783/(0.2885 + 0.286)\}(\Delta t/t_0) \times 10^{-6}$$

$$= -359935.59(\Delta t/t_0) \times 10^{-6}$$

As is evident from equation (4f), if stress dependent coefficient α of the object is determined before, the equation to calculate σ is extremely simplified. So the stress of the object can be rapidly and quantitatively calculated by measuring time of flight t under applied load and $t_0$ under zero load.

4-2) In the case of calculation of $\sigma_{T1}$ (refer to FIG. 8(B)). As is evident from FIG. 8(B), an empirical equation (9b) (linear equation) is obtained as the entire tendency of measurement data (a line corrected by a least squares method).

$$y = 11.525x - 241.45 \tag{9b}$$

$$\text{direction coefficient} = dy/dx = 11.525 = (\Delta t_n/t_0)/\sigma_n \tag{9c}$$

From FIG. 6(B), Young's modulus of S20C steel E=206783 MPa (9d) and from (9c), (9d) and equation (9)

$$\alpha = \alpha_{T1} \tag{9e}$$

$$= 1 - E(\Delta T_n/t_0)/\sigma_n$$

$$= 1 - 206783 \times 11.525 \times 10^{-6}$$

$$= -1.3832$$

The stress dependent coefficient α of S20C steel is −1.3832 in the ultrasonic wave propagating parallel to the applied load. The stress dependent coefficient α calculated from equation (10) is almost similar to that obtained from above equation (9e).

Substituting calculated stress dependent coefficient α and Young's modulus of S20C into equation (18), $$\sigma = \sigma_{T1} \tag{9f}$$

$$= \{E/(1 - \alpha_{T1})\} \cdot (\Delta t/t_0)$$

$$= \{206783/(1 + 1.3832)\} \cdot (\Delta t/t_0) \times 10^{-6}$$

$$= 86766.95(\Delta t/t_0) \times 10^{-6}$$

As is evident from equation (9f), if stress dependent coefficient α of the object is determined before, the equation to calculate σ is extremely simplified. So the stress of the object can be rapidly and quantitatively calculated by measuring time of flight t under applied stress and $t_0$ under zero load.

Above mentioned practice is an example using longitudinal wave, but transverse ultrasonic wave is also used. In the case of transverse wave, the equations concerning stress dependent coefficient α and stress σ can be obtained in a manner similar to mentioned above. Above is an example for tensile loadas applied load $\sigma_n$, but it is usable for compressive load. In the case of compressive load, the sign of stress σ changes because σ is vector.

Above mentioned practice is an example using measurement data of time of flight, but stress dependent coefficient α and stress σ can be also obtained using sound velocity. In this case, equation to calculate stress dependent coefficient α is $$\alpha = E(\Delta V_n/V_0)/\sigma_n \tag{A}$$

and equation for stress σ is $$\sigma = E(\Delta V_n/V_0)/\alpha \tag{B}$$

using these equations and determined α peculiar to the material, stress σ can be easily calculated.

Where $\Delta V_n = V_n - V_0$, $\Delta V = V - V_0$, V and $V_n$ are ultrasonic wave velocity on the object under applied unknown load and under changed load of $\sigma_n$ respectively. E is Young's modulus. These equations (A) and (B) canbe used for ultrasonicwave propagating either parallel or perpendicular to applied load $\sigma_n$.

INDUSTRIAL APPLICABILITY

Using this invention, the stress of the object under applied unknown load can be rapidly and quantitatively obtained. It is also possible to detect overload to the object and a void destruction. This invention to obtain the stress of the object can be applied to any parts, axes of trains and cars, support beam of rotary body, connective parts of airplanes and so on if time of flight or velocity of ultrasonic wave can be measured on these materials.

What is claimed is:

1. A stress measurement method comprising:
   providing a test piece comprising a same material as an object to be measured, and using an ultrasonic wave to measure a time of flight $t_o$ of sound propagating within the test piece when the test piece is under no stress and time of flight $t_n$ of sound propagating within the test piece when the test piece is under an applied stress $\sigma_n$;
   calculating a difference $\Delta t_n (\Delta t_n = t_n - t_o)$ between the time of flight $t_n$ and the time of flight $t_o$ based on plural information which corresponds to the time of flight $t_n$ and the time of flight $t_o$, calculating a stress dependent coefficient α which is a characteristic of the material of the object to be measured, wherein calculation of the stress dependent coefficient α is based on plural information including at least an intrinsic elastic constant and is defined by the formula $\alpha = f(\Delta t_n, \sigma_n)$;
   measuring a time of flight t of sound propagating within the object to be measured, the object to be measured being under an unknown applied stress;
   determining a practical internal stress σ of the object to be measured as an applied stress per unit time while the object to be measured is installed, wherein the practical internal stress is defined by the formula $\sigma = f(\Delta t, \alpha)$, where $\Delta t = t - t_o$.

2. The stress measurement method claimed in claim 1, the using an ultrasonic wave comprising:
   propagating an ultrasonic wave in a same direction as a direction of the applied stress $\sigma_n$ applied to the test piece when measuring the time of flight of the sound in the test piece; and
   the determining comprising calculating the practical internal stress σ using the formula $\sigma = E(\Delta t/t_o)/(1 - \alpha)$, where E represents Young's modulus of the object to be measured.

3. The stress measurement method claimed in claim 2, the calculation of the stress dependent coefficient comprising calculating the stress dependent coefficient using the formula $\alpha=\{1-E(\Delta t_n/t_o)/\sigma_n\}$, where n represents a number of measurements conducted on the time of flight $t_n$ of the sound.

4. The stress measurement method claimed in claim 1, wherein the using an ultrasonic wave comprises:
propagating an ultrasonic wave in a direction orthogonal to a direction in which the applied stress $\sigma_n$ is applied to the test piece when measuring the time of flight of sound in the test piece; and
the determining comprising calculating the practical internal stress $\sigma$ using the formula $\sigma=E(\Delta t/t_o)/(\nu+\alpha)$, where $\nu$ defines Poisson's ratio of the material of the object to be measured.

5. The stress measurement method claimed in claim 4, the calculation of the stress dependent coefficient comprising calculating the stress dependent coefficient $\alpha$ using the formula $\alpha=\{-\nu-E(\Delta t/t_o)/\sigma_n\}$.

6. A stress measurement apparatus comprising:
a measurer which measures time of flight t of sound propagating within an object to be measured, the object to be measured being installed and under an unknown applied stress;
the measurer being configured to measure a test piece which is of the same material as the object to be measured, wherein an ultrasonic wave is generated to measure a time of flight $t_o$ of sound propagating within the test piece when the test piece is under no stress and time of flight $t_n$ of sound propagating within the test piece when the test piece is under an applied stress $\sigma_n$;
a stress dependent coefficient calculator which calculates a stress dependent coefficient $\alpha$ which is a characteristic of the material of the object to be measured, the stress dependent coefficient calculator receiving plural information corresponding to the time of flights t, $t_o$, and $t_n$ and information corresponding to the applied stress $\sigma_n$, which corresponds to the information on the time of flight $t_n$, wherein a difference $\Delta t_n$ ($\Delta t_n = t_n - t_o$) between the time of flight $t_n$ and the time of flight $t_o$ is calculated based on the plural information which corresponds to the time of flight $t_n$ and the time of flight $t_o$ of the propagated sounds,
a main calculator which calculates a practical internal stress $\sigma$ of the object to be measured, the object to be measured being under the unknown applied stress, wherein the practical internal stress is defined by the formula $\sigma=f(\Delta t, \alpha)$, where $\Delta t=t-t_o$.

7. The stress measurement apparatus claimed in claim 6, wherein:
the measurer which measures the time of flight of sound sets a propagation direction of the generated ultrasonic wave, which is propagated to measure the time of flight of sound, to be in a same direction as a direction of the applied stress $\sigma_n$ which is applied to the test piece; and
the main calculator calculates the practical internal stress $\sigma$ using the formula $\sigma=E(\Delta t/t_o)/(1-\alpha)$, where E represents the Young's modulus of the object to be measured.

8. The stress measurement apparatus claimed in claim 7, wherein the stress dependent coefficient calculator comprises:
a time information extractor which receives inputs of a plurality of pieces of information including the applied stress $\sigma_n$ obtained by the measurer, and extracts the information on the time of flight $t_n$, $t_o$ of sounds from the inputted plurality of pieces of information;
a flight time change calculator which calculates a change in the time of flight $\Delta t_n$, which corresponds to the applied stress $\sigma_n$, based on the extracted information on the time of flight $t_n$, $t_o$ of the sounds;
and a stress dependent coefficient calculator which uses a formula $\alpha=\{1-E(\Delta t_n/t_o)/\sigma_n\}$, to calculate a stress dependent coefficient $\alpha$ based on the information on the time of flight of the sounds and the information on the applied stress $\sigma_n$.

9. The stress measurement apparatus claimed in claim 7, wherein the stress dependent coefficient calculator uses the formula $$\alpha = (1/k)\sum_{n=1}^{k}\{1-E(\Delta t_n/t_o)/\sigma_n\}$$

to calculate the stress dependent coefficient $\alpha$.

10. The stress measurement apparatus claimed in claim 6, wherein:
the measurer sets a propagation direction of the generated ultrasonic wave used for measuring the time of flight of sound to be in a direction which is orthogonal to a direction of the stress $\sigma_n$ that is applied to the test piece; and
the main calculator calculates a practical internal stress $\sigma$ of the object to be measured by using the formula $\sigma=f(\Delta t, \alpha)=-E(\Delta t/t_o)/(\nu=\alpha)$, where $\nu$ defines Poisson's ratio of the material of the object to be measured.

11. The stress measurement apparatus claimed in claim 10, wherein:
the stress dependent coefficient calculator comprises:
a time information extractor which receives inputs of information corresponding to the applied stress $\sigma_n$, obtained by the measurer, and extracts the information on the time of flight $t_n$, $t_o$ of sounds from the input information;
a flight time change calculator which calculates a change in the time of flight $\Delta t_n$, which corresponds to the applied stress $\sigma_n$, based on the extracted time information $t_n$, $t_o$;
and a stress dependent coefficient calculator which uses the formula $\alpha=\{-\nu-E(\Delta t_n/t_o)/\sigma_n\}$ to calculate the stress dependent coefficient $\alpha$ based on the information on the time of flight of the sounds and the information on the applied stress $\sigma_n$.

12. The stress measurement apparatus claimed in claim 10, wherein the stress dependent coefficient calculator uses the formula $$\alpha = (1/k)\sum_{n=1}^{k}\{-\nu-E(\Delta t_n/t_o)/\sigma_n\}$$

to calculate the stress dependent coefficient $\alpha$.

13. A stress measurement method comprising:
measuring a time of flight of an ultrasonic wave $t_o$ of a structural material under no stress or a least applied stress and time of flight of an ultrasonic wave $t_n$, wherein the time of flight of the ultrasonic wave $t_n$ is configured to respond to a change in distance from one face to an opposite face of the structural material, the change in distance resulting from a change in applied stress;
calculating a stress dependent coefficient $\alpha$ using a formula $\alpha=f(\Delta t_n, \sigma_n)$, wherein $\alpha$ is based on information corresponding to $t_n$, $t_o$ and $2^{nd}$ and $3^{rd}$ order Elastic Modulus of an object to be measured, and where $\Delta t_n$ represents the difference between $t_n$ and $t_o$, the object to be measured being of the material as the structural material;

measuring time of flight t of the object to be measured which is under an unknown applied stress, wherein the distance from the one face to the opposite face of the object is determined at approximately the same time that the time of flights $t_o$ and $t_n$ are measured and the stress dependent coefficient α is calculated; and using the information corresponding to the time of flights $t_n$, $t_o$ and $t_n$ and the calculated stress dependent coefficient α to calculate a practical internal stress σ which is defined by the formula σ=f ($\Delta t$, α), where $\Delta t = t - t_o$, and the practical internal stress σ is a characteristic of a material of the object to be measured which is installed under a practically applied stress.

14. The stress measurement method as claimed in claim 13, the measurement of the time of flight of the ultrasonic waves $t_o$ and $t_n$ comprising:

propagating the ultrasonic wave in a same direction as a direction of an applied stress $\sigma_n$ which is applied to the structural material when measuring the time of flight of sound in the structural material; and calculating the practical internal stress of the material of the object to be measured using the formula σ=E ($\Delta t/t_o$)/(1−α), where E represents Young's modulus of the object to be measured.

15. The stress measurement method as claimed in claim 14, wherein the calculation of the stress dependent coefficient α comprises using the formula $\alpha = \{1 - E(\Delta t_n/t_o)/\sigma_n\}$, where n represents a number of measurements conducted on the time of flight $t_n$ of the sound.

16. The stress measurement method as claimed in claim 15, wherein the measurement of the time of flight of the ultrasonic waves $t_o$ and $t_n$ comprises:

propagating the ultrasonic wave in a direction orthogonal to a direction in which the applied stress $\sigma_n$, is applied to the structural material when measuring the time of flight of sound in the structural material; and calculating the practical internal stress σ using the formula σ=E($\Delta t/t_o$)/(ν+α), where ν defines Poisson's ratio of the material of the object to be measured.

17. The stress measurement method as claimed in claim 16, the calculation of the stress dependent coefficient comprising calculating the stress dependent coefficient a using the formula $\alpha = \{-\nu - E(\Delta t/t_o)/\sigma_n\}$.

* * * * *